(12) United States Patent
Welton

(10) Patent No.: US 7,754,658 B2
(45) Date of Patent: *Jul. 13, 2010

(54) CROSSLINKED ACIDS COMPRISING DERIVATIZED XANTHAN AND SUBTERRANEAN ACIDIZING APPLICATIONS

(75) Inventor: Thomas D. Welton, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 472 days.

This patent is subject to a terminal disclaimer.

(21) Appl. No.: 11/709,552

(22) Filed: Feb. 22, 2007

(65) Prior Publication Data

US 2008/0207470 A1 Aug. 28, 2008

(51) Int. Cl.
*C09K 8/68* (2006.01)
*C09K 8/60* (2006.01)
*C09K 8/08* (2006.01)
*E21B 43/16* (2006.01)

(52) U.S. Cl. .................. 507/209; 507/110; 507/213; 166/307

(58) Field of Classification Search .............. 507/110, 507/209, 213; 166/294
See application file for complete search history.

(56) References Cited

U.S. PATENT DOCUMENTS

| | | | |
|---|---|---|---|
| 4,324,668 A * | 4/1982 | Harris | 507/215 |
| 5,211,859 A | 5/1993 | Horton et al. | 252/8.551 |
| 5,529,122 A | 6/1996 | Thach | 166/281 |
| 6,981,552 B2 | 1/2006 | Reddy, et al. | |
| 6,987,083 B2 | 1/2006 | Phillippi et al. | 507/213 |
| 7,159,658 B2 | 1/2007 | Frost et al. | |
| 2004/0182576 A1 * | 9/2004 | Reddy et al. | 166/295 |
| 2004/0261996 A1 | 12/2004 | Munoz, Jr. et al. | 166/279 |
| 2006/0014648 A1 | 1/2006 | Milson et al. | 507/213 |
| 2007/0187096 A1 * | 8/2007 | Pauls et al. | 166/280.1 |
| 2007/0281868 A1 | 12/2007 | Pauls et al. | |
| 2008/0035338 A1 | 2/2008 | Pauls et al. | |
| 2008/0039347 A1 | 2/2008 | Welton et al. | 507/213 |
| 2008/0078545 A1 | 4/2008 | Welton et al. | |
| 2008/0202759 A1 | 8/2008 | Welton | |

OTHER PUBLICATIONS

"Degradable Aliphatic Polyesters," edited by A.-C. Albertsson; Advances in Polymer Science, vol. 57, 2001.
Office Action from U.S. Appl. No. 11/709,551, Apr. 4, 2008.
Search Report and Written Opinion of International Application No. PCT/GB2008/000591, Feb. 20, 2008.
Office Action for U.S. Appl. No. 11/709,551, dated Dec. 1, 2008.
Office Action for U.S. Appl. No. 11/709,551, dated Jul. 17, 2009.
Notice of Allowance from U.S. Appl. No. 11/709,551, dated Mar. 9, 2010.

* cited by examiner

*Primary Examiner*—Timothy J. Kugel
*Assistant Examiner*—Aiqun Li
(74) *Attorney, Agent, or Firm*—Robert A. Kent

(57) ABSTRACT

Many methods are provided herein including, in one embodiment, a method comprising: providing a fluid that comprises an acid, crosslinked oxidized xanthan, and optionally, a base fluid; placing the fluid in a well bore penetrating a subterranean formation; and allowing the fluid to acidize at least a portion of the formation or damage contained therein. In another embodiment, herein provided is a fluid for subterranean uses comprising an acid and crosslinked, oxidized xanthan.

20 Claims, No Drawings

CROSSLINKED ACIDS COMPRISING DERIVATIZED XANTHAN AND SUBTERRANEAN ACIDIZING APPLICATIONS

BACKGROUND

The present invention relates to methods of acidizing subterranean formations or well bores, and more specifically, to acidizing fluids involving in-situ crosslinked spent acids and crosslinked live acids comprising derivatized xanthan for subterranean acidizing applications. These acidizing fluids may be used in any suitable acidizing treatment to acidize a portion of a subterranean formation or any damage contained therein. The term "damage" as used herein refers to undesirable deposits in a subterranean formation that may reduce its permeability. Scale, skin, and hydrates are contemplated by this term. Also contemplated by this term are geological deposits, such as but not limited to, carbonates located on the pore throats of the sandstone in a subterranean formation.

Acidizing and fracturing treatments using aqueous acidic solutions commonly are carried out in subterranean formations (including those that contain hydrocarbons as well as those that do not) penetrated by well bores to accomplish a number of purposes, one of which is to increase the permeability of the formation. The resultant increase in formation permeability normally results in an increase in the recovery of hydrocarbons from the formation.

Acidizing techniques can be carried out as "matrix acidizing" procedures or as "acid fracturing" procedures. Generally, in acidizing treatments, aqueous acidic solutions are introduced into a subterranean formation under pressure so that the acidic solution flows into the pore spaces of the formation to remove near-well formation damage and other damaging substances. The acidic solution reacts with acid-soluble materials contained in the formation which results in an increase in the size of the pore spaces and an increase in the permeability of the formation. This procedure commonly enhances production by increasing the effective well radius. When performed at pressures above the pressure required to fracture the formation, the procedure is often referred to as acid fracturing. Fracture-acidizing involves the formation of one or more fractures in the formation and the introduction of an aqueous acidizing fluid into the fractures to etch the fractures' faces whereby flow channels are formed when the fractures close. The aqueous acidizing fluid also enlarges the pore spaces in the fracture faces and in the formation. In fracture-acidizing treatments, one or more fractures are produced in the formation and the acidic solution is introduced into the fracture to etch flow channels in the fracture face. The acid also enlarges the pore spaces in the fracture face and in the formation. The use of the term "acidizing" herein refers to both types of acidizing treatments, and more specifically, refers to the general process of introducing an acid down hole to perform a desired function, e.g., to acidize a portion of a subterranean formation or any damage contained therein.

Although acidizing a portion of a subterranean formation can be very beneficial in terms of permeability, conventional acidizing fluids can have significant drawbacks. One major problem associated with conventional acidizing treatment fluids is that deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid concentration, temperature, fluid velocity, mass transfer, and the type of reactive material encountered. Whatever the rate of reaction of the acidic solution, the solution can be introduced into the formation only a certain distance before it becomes spent. For instance, conventional acidizing fluids, such as those that contain organic acids, hydrochloric acid or a mixture of hydrofluoric and hydrochloric acids, have high acid strength and quickly react with the formation itself, fines and damage nearest the well bore, and do not penetrate the formation to a desirable degree before becoming spent. To achieve optimal results, it is desirable to maintain the acidic solution in a reactive condition for as long a period of time as possible to maximize the degree of penetration so that the permeability enhancement produced by the acidic solution may be increased.

Another problem associated with some current acidizing fluids for subterranean formations is that synthetic polymers or surfactants are utilized to gel acidizing fluids. For instance, to obtain a delayed gel, only a few surfactant gels and polymer fluids will work. Moreover, generally, it is desirable in acidizing for the synthetic polymer to crosslink upon spending so that it may divert the unspent acid into a new portion of the formation. Thus, synthetic polymers are usually the preferred choice for such applications due to the wide range of temperatures at which they function and their ability to tolerate many additives. Note, though, some viscoelastic surfactants are another choice, but may suffer from compatibility issues with additives. Natural biopolymers are thought to be poor choices for crosslinked gel acidizing applications due to the relatively low temperatures they were believed to function at and their relatively poor cross linking ability.

Despite the advantages of using gelling agents in acid treatments, using such gelling agents may be problematic. For example, conventional polymeric gelling agents may leave an undesirable residue in the subterranean formation after use. As a result, potentially costly remedial operations may be required to clean up the surfaces inside the subterranean formation. Foamed treatment fluids and emulsion-based treatment fluids have been employed to minimize residual damage, but increased expense and complexity often result.

Biopolymers such as xanthan would be more desirable to use due to their degradability characteristics. Early experimentation, however, with xanthan yielded less than satisfactory gels. These gels tended to break or undergo syneresis easily, and often looked curdled with a cottage cheese-like consistency. Crosslinking xanthan can be especially difficult and/or impractical because the resultant crosslinked structure has been thought to be unusable and can have strange rheological properties.

SUMMARY

The present invention relates to methods of acidizing subterranean formations or well bores, and more specifically, to acidizing fluids involving in-situ crosslinked spent acids and crosslinked live acids comprising derivatized xanthan for subterranean acidizing applications. These acidizing fluids may be used in any suitable acidizing treatment to acidize a portion of a subterranean formation or any damage contained therein.

In one embodiment, the present invention provides a method comprising: providing a fluid that comprises an acid, crosslinked oxidized xanthan, and optionally, a base fluid; placing the fluid in a well bore penetrating a subterranean formation; and allowing the fluid to acidize at least a portion of the formation or damage contained therein.

In one embodiment, the present invention provides a method comprising: providing a fluid that comprises an acid, crosslinked oxidized xanthan, and optionally, a base fluid; and placing the fluid in a well bore penetrating a subterranean formation at a pressure sufficient to create or enhance a fracture in the subterranean formation.

In one embodiment, the present invention provides a method comprising: providing a fluid that comprises an acid, crosslinked oxidized xanthan, and optionally, a base fluid; placing the fluid into a subterranean formation; allowing the fluid to contact scale in the well bore or near well bore region; and allowing the acid to react with the scale.

In one embodiment, the present invention provides a method comprising: providing a fluid that comprises an acid, oxidized xanthan, and optionally, a base fluid; placing the fluid in a well bore penetrating a subterranean formation; and allowing the fluid to acidize at least a portion of the formation or damage contained therein.

In one embodiment, the present invention provides a fluid for subterranean uses comprising crosslinked, oxidized xanthan.

In one embodiment, the present invention provides a fluid for subterranean uses comprising oxidized xanthan.

In one embodiment, the present invention provides a composition comprising oxidized, crosslinked xanthan.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods of acidizing subterranean formations or well bores, and more specifically, to acidizing fluids involving in-situ crosslinked spent acids and crosslinked live acids comprising derivatized xanthan for subterranean acidizing applications. These acidizing fluids may be used in any suitable acidizing treatment to acidize a portion of a subterranean formation or any damage contained therein.

The compositions and methods of the present invention may be used in matrix acidizing applications, acidizing applications, fracture acidizing applications, scale removal applications, damage removal applications, hydrate treatment applications, and hydrate inhibition applications. They may also be used in open hole diversion applications.

Among the many potential benefits of the present invention, one advantage may be that the acidizing fluids of the present invention should achieve deeper penetration into the subterranean formation from the well bore. Additionally, longer effective fracture acidizing lengths should be realized at least in most embodiments than compared to ungelled acids. Another benefit may be that leak off may be less as compared to conventional ungelled acidic fluids. One of the more important benefits should be that deeper penetration of the acid into the subterranean formation should be obtained. Additionally, in certain embodiments, the acidizing fluids of the present invention should effectively generate wormholes to stimulate production in subterranean carbonate formations, dissolve damage, and remove fines to recover production in formations at elevated temperatures. Another potential benefit is that the these acidizing fluids should not leave undesirable residue like many synthetic polymers do, which could lead to easier and better clean-up. Other advantages and objects of the present invention may be evident to one skilled in the art with the benefit of this disclosure.

In certain embodiments, the acidizing fluids of the present invention comprise an acid, an oxidized crosslinked xanthan, and optionally, a base fluid.

If desired, acidizing fluids of the present invention also may comprise other gelling agents, diverting agents, non-emulsifiers, other acids, cross linking agents, and/or mutual solvents. Combinations and derivatives of these also may be suitable. Although some fluid loss control agents may be used if needed, in the fluids of the present invention there should be less need for additional fluid loss control because the fluids can crosslink. This may be application dependent. Any fluid loss may affect the ability to create longer fractures. Any sort of proppant particulates may be included if desired as well. The acidizing fluids of the present invention may further comprise additional additives as deemed appropriate by one of ordinary skill in the art, with the benefit of this disclosure. Examples of such additional additives include, but are not limited to, pH-adjusting agents, pH-buffers, oxidizing agents, enzymes, lost circulation materials, scale inhibitors, surfactants, clay stabilizers, corrosion inhibitors, paraffin inhibitors, asphaltene inhibitors, penetrating agents, clay control additives, iron control additives, chelators, reducers, oxygen scavengers, sulfide scavengers, emulsifiers, foamers, gases, derivatives thereof and combinations thereof, and the like.

Any acid suitable for use in subterranean applications may be used in conjunction with the present invention. The acid may comprise organic acids, inorganic acids, derivatives thereof, or combinations thereof. Examples of suitable acids include, but are not limited to, hydrochloric acid, hydrofluoric acid, formic acid, lactic acid, phosphoric acid, sulfamic acid, acetic acid, derivatives thereof, and mixtures thereof. In certain embodiments, the acid may be present in the treatment fluids in an amount of from about 0.5% to about 40% by weight of the fluid. In certain embodiments, the acid may be present in the treatment fluids of the present invention in an amount of from about 2.5% to about 28% by weight of the fluid. In other embodiments, the acid may be present in the treatment fluids of the present invention in an amount of from about 2.5% to about 15% by weight of the fluid. Individuals skilled in the art, with the benefit of this disclosure, will be able to select a suitable acid and a suitable concentration thereof for a chosen application. In some instances, the particular concentration used in any particular embodiment depends on what acid is being used, and what percentage of acid is present. Other complex, interrelated factors that may be considered in deciding how much of the acid compound to use include, but are not limited to, the composition of the formation, the temperature of the formation, the pressure of the formation, the particular fines and damage present in the formation (e.g., scale, skin, calcium carbonate, silicates, and the like), the particular acid used, metals the acid may contact, corrosion concerns, the expected contact time of the acid with the formation, etc. The desired contact time also depends on the particular application and purpose. For example, if very delayed acidizing is desired, then it may be desirable to pump a dilute, low concentration but a high volume to get deeper penetration. For matrix stimulation treatments, the expected contact time may be determined from the maximum pumping rate that does not cause the down hole pressure to exceed the fracturing pressure. For damage or fines removal procedures, the expected contact time may be based on laboratory tests, but usually should allow for extended contact periods as compared to conventional acid treatments. For instance, in conventional treatments where a live acid is pumped to remove scale or fines, that acid may react instantaneously so clean up of the entire amount of damage and fines may be impossible. Possibly, to achieve an equivalent of a 15% HCl acidizing treatment, it may be desirable to run formates and acetates mixtures, depending on which ones are chosen with an eye toward the reactivity of the formation at a given temperature. To avoid undesirable salt precipitation problems, it may be desirable to combine formates and acetates or lactates to keep both below the over saturation concentration that would cause salts to precipitate in formation, but still achieve the acid potential and dissolving power necessary for the job. To choose the appropriate acid and the right concentration of that acid, one should balance salt precipitation and acid dissolving power concentration concerns. In some embodiments, a combination of acetic acid and formic or a combination of acetic acid and lactic acid may be preferred over a combination of acetic acid and formic acid and lactic acid. One of ordinary skill in the art with the benefit of this disclosure should know how to balance the factors so that salts do not saturate.

The acidizing fluids of the present invention comprise crosslinked oxidized xanthan, which, inter alia, acts as a gelling agent to viscosify the fluid. Preferably, the xanthan polymer used is of high purity. One of ordinary skill in the art with the benefit of this disclosure will recognize the grade of purity of xanthan polymer appropriate for a particular application. An example of a suitable source of xanthan polymer is commercially available from Kelco Oil Field Group, of Houston, Tex., under the tradename "XANVIS L." An example of another suitable source of xanthan polymer is commercially available from Halliburton Energy Services, Inc., of Duncan, Okla., under the tradename "WG-24." An example of another suitable source of xanthan polymer is commercially available from Halliburton Energy Services, Inc., of Duncan, Okla., under the tradename "WG-37." The amount of oxidized xanthan to include in a fluid of the present invention will depend on several factors including, but not limited to the desired viscosity of the fluid, the characteristics of the formation, the characteristics of the acidizing application, etc. Preferred xanthans are disclosed in U.S. Published Patent Application No. 2006/0014648, which is incorporated herein by reference. Other considerations will be known to those skilled in the art with the benefit of this disclosure. In some embodiments, the amount may range from about 10 to about 200 lbs/1000 gallons of the fluid. In other embodiments, the amount may range from about 20 to about 160 lbs/1000 gallons of fluid.

Suitable oxidizers for oxidizing the xanthan polymer include, but are not limited to, salts of perborates, salts of permanganates, salts of percarbonates, salts of periodates, salts of hypochlorite, sodium perborate, sodium persulfate, potassium persulfate, ammonium persulfate, sodium permanganate, potassium permanganate, magnesium permanganate, calcium permanganate, sodium percarbonate, potassium percarbonate, sodium periodate, potassium periodate, sodium hypochlorite, hydrogen peroxide, calcium peroxide, and magnesium peroxide. Derivatives and combinations of these may also be suitable. To oxidize the xanthan, in certain embodiments, the oxidizer may used in an amount of from about 0.01% to about 50% based on the amount of the xanthan present. A more preferred range would be from about 0.1 to about 10% and an even more preferred would be from about 0.5 to about 5% Generally speaking, one thing to be mindful of is that the more oxidizer used, the faster the oxidation reaction will be.

In some embodiments, the xanthan polymer may be pre-oxidized and taken in its oxidized form to a well site for use in a subterranean application. In other instances, the xanthan may be oxidized at the well site. However, it is preferred that the oxidizer be added to the xanthan before the acid is added to the xanthan even if the xanthan is oxidized at the well site.

At least a portion of the oxidized xanthan included in the fluids of the present invention may be crosslinked by a reaction comprising a crosslinking agent, e.g., to further increase the treatment fluid's viscosity thereof. The oxidized xanthan can be crosslinked before the fluid is placed in a well bore or at any other suitable time. Crosslinking agents typically comprise at least one metal ion that is capable of crosslinking polymer molecules. Really there are an unlimited number of crosslinking agents that may be suitable because the compositions of the present invention are not limited by ligand choice on the crosslinking agent. Examples of suitable crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum lactate or aluminum citrate); borate compounds (such as, for example, sodium tetraborate, boric acid, disodium octaborate tetrahydrate, sodium diborate, ulexite, and colemanite); antimony compounds; chromium compounds; iron compounds; copper compounds; zinc compounds; or derivatives and combinations thereof. An example of a suitable commercially available zirconium-based cross linking agent is "CL-24™" cross linker from Halliburton Energy Services, Inc., Duncan, Okla. An example of a suitable commercially available titanium-based cross linking agent is "CL-39™" cross linker from Halliburton Energy Services, Inc., Duncan Okla. An example of a suitable borate-based cross linking agent is commercially available as "CL-22™" delayed borate cross linker from Halliburton Energy Services, Inc., Duncan, Okla. Divalent ions also may be used; for example, calcium chloride and magnesium oxide. An example of a suitable divalent ion cross linking agent is commercially available as "CL-30™" from Halliburton Energy Services, Inc., Duncan, Okla. Another example of a suitable cross linking agent is "CL-15," from Halliburton Energy Services, Inc., Duncan Okla. Where present, the cross linking agent generally should be included in the fluids of the present invention in an amount sufficient, among other things, to provide the desired degree of cross linking. In some embodiments, the cross linking agent may be present in the treatment fluids of the present invention in an amount in the range of from about 0.01% to about 5% by weight of the treatment fluid. Buffering compounds may be used if desired, e.g., to delay or control the cross linking reaction. These may include glycolic acid, lactic acid, carbonates, bicarbonates, acetates, phosphates, and any other suitable buffering agent.

Preferred crosslinking agents are iron compounds such as iron chloride. When an iron compound is used, one can achieve a delayed crosslink (or one that crosslinks in-situ). Using a delayed crosslinked acid as opposed to a crosslinked "live" acid (e.g., one that has been crosslinked prior to the acid substantially spending) may have several benefits. Delayed crosslinked acids may be more pumpable than crosslinked live acid acidizing fluids. One possible limitation of crosslinked live acid acidizing fluids is that they may have high viscosity that may lead to increased frictional pressures during pumping, which may require greater pumping horsepower. Also, fully crosslinked live acids are not always necessary to retard the reaction of strong acids on carbonates; merely viscosifying the acid can provide ample retardation.

However, in such treatments much of the acid may be lost as a result of leak-off through wormholes. When using a delayed crosslinked fluid, fluid loss can be controlled as the acid leaks off through wormholes and spends. When the acid is nearly spent, the system may crosslink, thereby blocking wormholes and preventing further loss of acid from the fracture face. Additionally, this type of fluid typically will not break until the acid is substantially spent.

One should note that including a suitable breaker in an acidizing fluid of the present invention or adding a suitable breaker to an acidizing fluid of the present invention may be advisable depending on the xanthan and its interaction with the acid and the well bore conditions. A breaker or breaker aid may be advisable to ultimately reduce the viscosity of the fluid. Any breaker suitable for the subterranean formation and the xanthan may be used. The amount of a breaker to include will depend, inter alia, on the amount of xanthan present in the treatment fluid. Other considerations regarding the breaker are known to one skilled in the art with the benefit of this disclosure.

Optionally, an iron control additive may be used in conjunction with the acidizing fluids of the present invention to prevent potential precipitation of the iron. Typical examples include, but are not limited to, citric acid, ethylenediaminetetraacetic acid, nitrilotriacetic acid, and erythorbic acid, and salts thereof. The amount of an iron control additive to include will depend, inter alia, on the amount of potential iron precipitates present in the treatment fluid. Other considerations regarding the iron control additive are known to one skilled in the art with the benefit of this disclosure If used, the base fluid is preferably aqueous-based. A base fluid may be beneficially used, for example, to provide dilution to control concentration or coverage issues. One of ordinary skill in the art with the benefit of this disclosure will recognize when a base fluid may be beneficial. The base fluid should be chosen based on its compatibility with the formation and the acid used. Suitable base fluids include fresh water, brines, seawater, or any other type of aqueous-fluid suitable for subterranean uses. The amount of base fluid used is typically dictated by the final concentration of acid desired and the concentration of the acid source. One of ordinary skill in the art with the benefit of this disclosure ill recognize the appropriate amount of base fluid to include to reach the final concentrations desired for a chosen application.

In order to insure that the producing zone is contacted by a fluid of the present invention uniformly, a supplemental particulate solid diverting agent may be placed in the well bore or the formation to isolate the zone of interest. The term "zone" as used herein simply refers to a portion of the formation and does not imply a particular geological strata or composition. One suitable technique involves packing the diverting agent in perforation tunnels extending from the well bore into the subterranean zone. The diverting agent in the perforation tunnels causes the fluid introduced therein to be uniformly distributed between all of the perforations whereby the subterranean zone is uniformly treated. The particulate solid diverting agent should be subsequently removed from the perforation tunnel to allow the maximum flow of produced hydrocarbons from the subterranean zone into the well bore. This can be accomplished by contacting the particulate solid diverting agent with a fluid which degrades the diverting agent, such as, water, oil, xylene and the like. Other chemical diverting agents that are suitable for use in this invention include oil-soluble resins, water-soluble rock salts, and emulsions.

Degradable particulate diverting materials are also suitable for use in the present invention. The degradable particulate diverting materials of this invention can be placed in the subterranean zone or packed into perforation tunnels in the subterranean zone by introducing a carrier fluid containing the degradable particulate diverting materials into the subterranean zone. Preferred degradable particulate diverting materials may comprise a degradable material which is capable of degrading over time when placed in a subterranean zone and will not recrystallize or otherwise solidify down hole. The degradable particular diverting materials may need a source of water to degrade and this may be provided by a particulate hydrated organic or inorganic solid compounds introduced into the subterranean formation either before, during or after the degradable particulate diverting material is introduced. Nonlimiting examples of degradable particulates that may be used in conjunction with the compositions and methods of the present invention include but are not limited to degradable polymers. The term "particulate" as used herein is intended to include material particles having the physical shape of platelets, shavings, flakes, ribbons, rods, strips, spheroids, toroids, pellets, tablets or any other physical shape. The terms "degrade," "degradation," "degradable," and the like when used herein refer to both the two relative cases of hydrolytic degradation that the degradable particulate may undergo, i.e., heterogeneous (or bulk erosion) and homogeneous (or surface erosion), and any stage of degradation in between these two. This degradation can be a result of inter alia, a chemical or thermal reaction or a reaction induced by radiation. Suitable examples of degradable polymers that may be used in accordance with the present invention include but are not limited to those described in the publication of Advances in Polymer Science, Vol. 157 entitled "Degradable Aliphatic Polyesters" edited by A.-C. Albertsson. Specific examples include homopolymers, random, block, graft, and star- and hyper-branched aliphatic polyesters. Polycondensation reactions, ring-opening polymerizations, free radical polymerizations, anionic polymerizations, carbocationic polymerizations, coordinative ring-opening polymerizations, and any other suitable process may prepare such suitable polymers. Specific examples of suitable polymers include polysaccharides such as dextran or cellulose; chitins; chitosans; proteins; aliphatic polyesters; poly(lactides); poly(glycolides); poly(e-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Of the suitable aliphatic polyesters, poly (lactide) is preferred. The degradable particulate diverting agents may comprise a plasticizer.

In some embodiments, a self-degradable particulate diverting material which degrades over time may be placed in the subterranean zone. The self-degradable particulate diverting material comprises a mixture of a degradable aliphatic polyester and a hydrated organic or inorganic solid compound. A treating fluid may be introduced into the subterranean zone and then diverted by the self-degradable particulate diverting material therein. Thereafter, the degradable aliphatic polyester in the self-degradable particulate diverting material is allowed to at least partially degrade in the releasable water provided by the hydrated organic or inorganic compound which dehydrates over time when heated in the subterranean zone. Examples of the hydrated organic or inorganic solid compounds that can be utilized in the self-degradable diverting material include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound utilized are preferably present in the mixture in equal molar amounts. The specific amount of the hydrated compound that may be included will depend upon the presence of formation water, produced fluids, formation temperature, treating fluid and production rates.

Suitable diverting agents may be provided to the subterranean formation via a carrier fluid that then dissipates into the subterranean zone, and as a result the degradable particulate diverting materials is screened out of the carrier fluid by the formation. A variety of carrier fluids can be utilized including, but not limited to, water, brines, seawater or formation water. Of these, in certain embodiments, brines and seawater are preferred.

If a diverting agent is used, the amount used may range up to 3% or more by weight or volume of the carrier fluid. Preferred diverting agents are disclosed in Halliburton's Published U.S. Patent Application No. 2004-0261996-A1, entitled Methods of Diverting Treating Fluids in Subterranean Zones and Degradable Diverting Materials, filed on Jun. 27, 2003 and published on Dec. 30, 2004, the disclosure of which is incorporated by reference.

Mechanical diverting agents may also be suitable. These may include but are not limited to, perf balls, packers, treatment designs, hydrojetting methods, and methods known as "Surgifrac," which are available from Halliburton Energy Services, at various locations.

In some embodiments, the fluids of the present invention may include surfactants, e.g., to improve the compatibility of the fluids of the present invention with other fluids (like any formation fluids) that may be present in the well bore or reduce interfacial tension. Using surfactants may be advisable when liquid hydrocarbons are present in the well bore. An artisan of ordinary skill with the benefit of this disclosure will be able to identify the type of surfactant as well as the appropriate concentration of surfactant to be used. Suitable surfactants may be used in a liquid or powder form. Where used, the surfactants are present in the fluids in an amount sufficient to prevent incompatibility with formation fluids or well bore fluids. If included, a surfactant may be added in an amount of from about 1/10th of a gal per 1000 gals up to 10% by volume. Higher concentrations may be used, e.g., if a surfactant gelling agent is used, and this amount may be in excess of 5% in some instances. In an embodiment where liquid surfactants are used, the surfactants are generally present in an amount in the range of from about 0.01% to about 10% by volume of a fluid. In one embodiment, the liquid surfactants are present in an amount in the range of from about 0.1% to about 10% by volume of the fluid. In embodiments where powdered surfactants are used, the surfactants may be present in an amount in the range of from about 0.001% to about 10% by weight of the fluid. Examples of suitable surfactants are non-emulsifiers commercially available from Halliburton Energy Services, Inc., of Duncan, Okla., under the tradenames "LOSURF-259™" nonionic nonemulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the tradename "NEA-96M™" Surfactant. It should be noted that it may be beneficial to add a surfactant to a viscosified treatment fluid of the present invention as that fluid is being pumped down hole to help eliminate the possibility of foaming if so desired.

In some embodiments, the acidizing fluids of the present invention may be used in conjunction with fluids containing viscoelastic surfactants.

In some embodiments, if desired, the fluids of the present invention may contain bactericides, inter alia, to protect both the subterranean formation as well as the fluid from attack by bacteria. Such attacks may be problematic because they may lower the viscosity of the fluid, resulting in poorer performance, for example. Bacteria also can cause plugging by bacterial slime production, and can turn the formation sour. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include, but are not limited to, a 2,2-dibromo-3-nitrilo-propionamide, commercially available under the tradename "BE-3S™" biocide from Halliburton Energy Services, Inc., of Duncan, Okla., and a 2-bromo-2-nitro-1,3-propanediol commercially available under the tradename "BE-6™" biocide from Halliburton Energy Services, Inc., of Duncan, Okla. In one embodiment, the bactericides are present in the viscosified treatment fluid in an amount in the range of from about 0.001% to about 0.003% by weight of the viscosified treatment fluid. Another example of a suitable bactericide is a solution of sodium hypochlorite, commercially available under the tradename "CAT-1™" chemical from Halliburton Energy Services, Inc., of Duncan, Okla. In certain embodiments, such bactericides may be present in the viscosified treatment fluid in an amount in the range of from about 0.01% to about 0.1% by volume of the viscosified treatment fluid. In certain preferred embodiments, when bactericides are used in the viscosified treatment fluids of the present invention, they are added to the viscosified treatment fluid before the gelling agent is added.

In some embodiments, the fluids of the present invention can be prepared in any suitable tank equipped with suitable mixing means well known to those skilled in the art. The fluids may be transferred either at a controlled rate directly into the well bore or into a convenient storage tank for later placement down the well bore. In either event, the pumping rates and pressures utilized will depend upon the characteristics of the formation and whether or not fracturing of the formation is desired. After a fluid has been injected into a well bore, the well may be shut in and allowed to stand for a period of several hours or more depending on the type of acid employed and the formation treated. If there is pressure in the well, pressure then can be released and then the spent or at least partially spent fluid (that likely contains salts formed by the reaction of the acid in the subterranean formation), may be permitted to flow back to the surface for appropriate disposal. The well then can be placed on production or used for other purposes.

Additionally, in some embodiments, the diverting effect of the acidizing fluids of the present invention may be enhanced by introducing the fluid into a subterranean formation in stages. The first stage involves pumping stages of the acidizing fluid containing an iron crosslinking agent, and then stopping pumping for a short amount of time to allow an in-situ crosslink to form before resuming pumping of the treatment fluid. A preferred method of this would be to use a low strength acid in the shut in stage to provide a faster crosslink. A preferred range for this would be 1 to 10% acid and a more preferred range would be 2.5 to 7.5% acid. An acid concentration of about 5% is highly preferred.

To facilitate a better understanding of the present invention, the following examples of certain aspects of some embodiments are given. In no way should the following examples be read to limit, or define, the entire scope of the invention.

EXAMPLES

An 80 lb/Mgal xanthan gel ("WG-37" xanthan was used and is available from Halliburton Energy Services, Inc., in Duncan, Okla.) was hydrated in water for 30 minutes in a Waring blender, and then oxidized with 5% by volume sodium hypochlorite (6-7.35% sodium hypochlorite in water). Upon a short oxidation (approximately 5 minutes) while mixing, hydrochloric acid was added to a concentration in the final fluid of 15% HCl. Crosslinking agents were also added. When 2% by volume "CL-23," which is a zirconium-based crosslinking agent available from Halliburton Energy Services in Duncan, Okla., was added to an aliquot, a lipping, live-acid gel was formed. In the case of adding 1% "XL-1" to an aliquot, which is a iron-based crosslinking agent available from Halliburton Energy Services in Duncan, Okla. a crosslinked gel was formed as the acid spent with calcium carbonate.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A fluid for subterranean uses comprising an acid and crosslinked, oxidized xanthan, wherein the crosslinked, oxidized xanthan is crosslinked with a crosslinking agent comprising a metal ion.

2. The fluid of claim 1 wherein the fluid further comprises at least one additional component chosen from the group consisting of: a gelling agent; a diverting agent; a particulate solid diverting agent; a degradable particulate diverting material; a self-degradable particulate diverting material; a mechanical diverting agent; a surfactant; a viscoelastic surfactant; a bactericide; a nonemulsifier; a second acid; a crosslinking agent; a mutual solvent; a fluid loss control agent; a proppant particulate; a pH-adjusting agent; a pH-buffer; an oxidizing agent; an enzyme; a lost circulation material; a scale inhibitor; a surfactant; a clay stabilizer; a corrosion inhibitor; a paraffin inhibitor; an asphaltene inhibitor; a penetrating agent; a clay control additive; an iron control additive; a chelator; a reducer; an oxygen scavenger; a sulfide scavenger; an emulsifier; a foamer; a gas; a breaker; an iron control additive; a derivative thereof; and a combination thereof.

3. The fluid of claim 1 wherein the acid comprises an acid chosen from the group consisting of: organic acids; inorganic acids; hydrochloric acid; hydrofluoric acid; formic acid; lactic acid; phosphoric acid; sulfamic acid; acetic acid; derivatives thereof; and combinations thereof.

4. The fluid of claim 1 wherein the oxidized xanthan becomes crosslinked after being placed in a well bore.

5. The fluid of claim 1 wherein the oxidized xanthan becomes crosslinked before being placed in a well bore.

6. The fluid of claim 1 wherein the crosslinked oxidized xanthan has been oxidized in a process involving an oxidizer chosen from the group consisting of: salts of perborates; salts of permanganates; salts of percarbonates; salts of periodates; salts of hypochlorite; sodium perborate; sodium persulfate; potassium persulfate; ammonium persulfate; sodium permanganate; potassium permanganate; magnesium permanganate; calcium permanganate; sodium percarbonate; potassium percarbonate; sodium periodate; potassium periodate; sodium hypochlorite; hydrogen peroxide; calcium peroxide; magnesium peroxide; derivatives thereof; and combinations thereof.

7. The fluid of claim 1 wherein the crosslinked oxidized xanthan is pre-oxidized before it is taken to a well site.

8. The fluid of claim 1 wherein the crosslinked xanthan has been crosslinked by use of a crosslinking agent chosen from the group consisting of: zirconium compounds; zirconium lactate; zirconium lactate triethanolamine; zirconium carbonate; zirconium acetylacetonate; zirconium maleate; zirconium citrate; zirconium oxychloride; zirconium diisopropylamine lactate; titanium compounds; titanium lactate; titanium maleate; titanium citrate; titanium ammonium lactate; titanium triethanolamine; titanium acetylacetonate; aluminum compounds; aluminum lactate; aluminum citrate; borate compounds; sodium tetraborate; boric acid; disodium octaborate tetrahydrate; sodium diborate; ulexite; colemanite; antimony compounds; chromium compounds; iron compounds; iron chloride; copper compounds; zinc compounds; divalent ions; calcium chloride; magnesium oxide; derivatives thereof; and combinations thereof.

9. The fluid of claim 1 further comprising a base fluid wherein the base fluid comprises an aqueous-based fluid.

10. A fluid for subterranean uses comprising oxidized xanthan crosslinked with a crosslinking agent comprising a metal ion.

11. The fluid of claim 10 further comprising an acid, wherein the acid comprises an acid chosen from the group consisting of: organic acids; inorganic acids; hydrochloric acid; hydrofluoric acid; formic acid; lactic acid; phosphoric acid; sulfamic acid; acetic acid; derivatives thereof; and combinations thereof.

12. The fluid of claim 10 wherein the oxidized xanthan becomes crosslinked after being placed in a well bore.

13. The fluid of claim 10 wherein the oxidized xanthan becomes crosslinked before being placed in a well bore.

14. The fluid of claim 10 wherein the oxidized xanthan has been oxidized in a process involving an oxidizer chosen from the group consisting of: salts of perborates; salts of permanganates; salts of percarbonates; salts of periodates; salts of hypochlorite; sodium perborate; sodium persulfate; potassium persulfate; ammonium persulfate; sodium permanganate; potassium permanganate; magnesium permanganate; calcium permanganate; sodium percarbonate; potassium percarbonate; sodium periodate; potassium periodate; sodium hypochlorite; hydrogen peroxide; calcium peroxide; magnesium peroxide; derivatives thereof; and combinations thereof.

15. The fluid of claim 10 wherein the crosslinked xanthan has been crosslinked by use of a crosslinking agent chosen from the group consisting of: zirconium compounds; zirconium lactate; zirconium lactate triethanolamine; zirconium carbonate; zirconium acetylacetonate; zirconium maleate; zirconium citrate; zirconium oxychloride; zirconium diisopropylamine lactate; titanium compounds; titanium lactate; titanium maleate; titanium citrate; titanium ammonium lactate; titanium triethanolamine; titanium acetylacetonate; aluminum compounds; aluminum lactate; aluminum citrate; borate compounds; sodium tetraborate; boric acid; disodium octaborate tetrahydrate; sodium diborate; ulexite; colemanite; antimony compounds; chromium compounds; iron compounds; iron chloride; copper compounds; zinc compounds; divalent ions; calcium chloride; magnesium oxide; derivatives thereof; and combinations thereof.

16. The fluid of claim 10 further comprising a base fluid wherein the base fluid comprises an aqueous-based fluid.

17. A method of forming a viscosified fluid comprising:
providing oxidized xanthan;
adding acid to the oxidized xanthan;
optionally adding a base fluid; and
crosslinking the oxidized xanthan with a crosslinking agent comprising a metal ion so as to form a viscosified fluid.

18. The fluid of claim 17 wherein the oxidized xanthan becomes crosslinked after being placed in a well bore.

19. The fluid of claim 17 wherein the oxidized xanthan has been oxidized in a process involving an oxidizer chosen from the group consisting of: salts of perborates; salts of permanganates; salts of percarbonates; salts of periodates; salts of hypochlorite; sodium perborate; sodium persulfate; potassium persulfate; ammonium persulfate; sodium permanganate; potassium permanganate; magnesium permanganate; calcium permanganate; sodium percarbonate; potassium percarbonate; sodium periodate; potassium periodate; sodium hypochlorite; hydrogen peroxide; calcium peroxide; magnesium peroxide; derivatives thereof; and combinations thereof.

20. The fluid of claim 17 wherein the crosslinking agent is chosen from the group consisting of: zirconium compounds; zirconium lactate; zirconium lactate triethanolamine; zirconium carbonate; zirconium acetylacetonate; zirconium maleate; zirconium citrate; zirconium oxychloride; zirconium diisopropylamine lactate; titanium compounds; titanium lactate; titanium maleate; titanium citrate; titanium ammonium lactate; titanium triethanolamine; titanium acetylacetonate; aluminum compounds; aluminum lactate; aluminum citrate; borate compounds; sodium tetraborate; boric acid; disodium octaborate tetrahydrate; sodium diborate; ulexite; colemanite; antimony compounds; chromium compounds; iron compounds; iron chloride; copper compounds; zinc compounds; divalent ions; calcium chloride; magnesium oxide; derivatives thereof; and combinations thereof.

* * * * *